United States Patent [19]

Peuscher et al.

[11] Patent Number: 4,906,744

[45] Date of Patent: Mar. 6, 1990

[54] WATER-SOLUBLE ETHERS SUBSTITUTED WITH ALKENYL OR ALKYL SUCCINIC ACID ESTERS

[75] Inventors: Manfred Peuscher, Duesseldorf; Konrad Engelskirchen, Meerbusch; Eberhard Gruenberger, Hilden, all of Fed. Rep. of Germany

[73] Assignee: Henkel Corporation, Ambler, Pa.

[21] Appl. No.: 307,211

[22] Filed: Feb. 3, 1989

Related U.S. Application Data

[63] Continuation of Ser. No. 66,374, Jun. 23, 1987, abandoned.

[30] Foreign Application Priority Data

Jun. 23, 1986 [DE] Fed. Rep. of Germany ....... 3620991

[51] Int. Cl.$^4$ ................................................. C08B 3/00
[52] U.S. Cl. .................................... 536/63; 536/66; 536/108; 536/110
[58] Field of Search ..................... 536/66, 110, 63, 108

[56] References Cited

U.S. PATENT DOCUMENTS

2,661,349 12/1953 Caldwell et al. .................... 536/63

FOREIGN PATENT DOCUMENTS

2063880 10/1981 United Kingdom .

Primary Examiner—Joseph L. Schoffer
Assistant Examiner—Alex H. Walker
Attorney, Agent, or Firm—Wayne C. Jaeschke; James K. Luchs

[57] ABSTRACT

A method for the production of new derivatives of watersoluble cellulose ethers by the reaction of 100 parts by weight of a water-soluble cellulose ether with 3 to 30 parts by weight of $C_{8-18}$ alkyl(ene) succinic acid anhydride, in the absence of water and under neutral or acid conditions at elevated temperature, until, in analytically detectable terms, 1 to 8% by weight, based on the cellulose ether, of alk(en)yl succinic acid has reacted with the cellulose molecule; the products of the method; and their use as thickners for aqueous surfactant solutions, dye dispersions, and for hydraulically setting building materials or their use as protective colloids or emulsifiers in the suspension polymerization of water-insoluble monomers in aqueous phase.

17 Claims, No Drawings

WATER-SOLUBLE ETHERS SUBSTITUTED WITH ALKENYL OR ALKYL SUCCINIC ACID ESTERS

This application is a continuation of application Ser. No. 07/066,374, filed 6/23/87, now abandoned.

BACKGROUND OF THE INVENTION

1. Field of the Invention

This invention relates to water-soluble cellulose ethers containing alkenyl and/or alkyl succinic acid ester moieties which are capable of forming highly viscous aqueous solutions.

2. State of Related Art

U.S. Pat. No. 2,661,349 describes a process for the production of water-soluble derivatives of cellulose or starch which comprises a substitution with long-chain dicarboxylic acid anhydrides, such as alkenyl succinic acid anhydride. The patent specification describes (1) a method in aqueous medium, (2) a solvent-free method (called dry method), and (3) a method in suspension in organic solvents. In every case, however, the presence of water is either required or is not ruled out and an alkaline range, established by an excess of sodium carbonate for example, is compulsory. If this method is applied to water-soluble cellulose derivatives, particularly in aqueous phase, no reaction of the alkenyl succinic acid anhydride is observed.

DESCRIPTION OF THE INVENTION

Other than in the operating examples, or where otherwise indicated, all numbers expressing quantities of ingredients or reaction conditions used herein are to be understood as modified in all instances by the term "about".

The present invention provides a new method for simply and reproducibly obtaining hitherto unknown water-soluble cellulose derivatives which, in addition to the water-solubilizing moieties already present, (such as methyl, methoxyl, hydroxyethyl, hydroxypropyl and/or methylhydroxypropyl, all of which are starting materials), also contain ester moieties derived from alkyl and/or alkenyl succinic acid. This invention also relates to the preparation of cellulose derivatives of a type which, unlike monosubstituted cellulose ethers, dissolve in water causing a particularly high viscosity. Furthermore, this invention affords methods for using these cellulose derivatives as thickeners, protective colloids, emulsifiers, and the like.

According to the invention, at least one water-soluble cellulose ether is reacted with at least one alkenyl or alkyl succinic acid anhydride. Specifically, 100 parts by weight of at least one of the water-soluble cellulose ethers is reacted with from 3 to 30, preferably 5 to 25, parts by weight of at least one $C_{8-18}$ (preferably $C_{10-14}$) alkyl succinic acid anhydride, the alkenyl radical optionally comprising one or more double bonds. The reaction is in the absence of (essentially free of) water, at a neutral or acid (preferably acid) pH, at elevated temperature and under such conditions that 1 to 8% by weight, by analytic determination and based on the cellulose ether, of the alkyl succinic acid anhydrides have reacted with the cellulose ether molecule. Particularly favorable results are obtained when 3 to 6% by weight of the substituted succinic acid anhydrides have reacted with the cellulose molecule.

The alkenyl succinic acid anhydrides, which have the formula

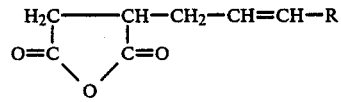

where R is $C_{5-15}$ alkyl, are known compounds. They may be prepared by indirect substitution addition of alpha-olefins onto maleic acid anhydride (ene synthesis). The C=C double bond present in the molecule may readily be hydrogenated and the corresponding alkyl succinic acid anhydride thus obtained.

The reaction of the substituted succinic acid anhydrides with the water-soluble cellulose ethers may be carried out in various water-free organic solvent media. In the most simple case, the alkyl(ene) succinic acid anhydride is dissolved in at least one water-free aprotic solvent and the resulting solution sprayed onto the cellulose ether while it is under mechanical agitation. Sufficiently uniform distribution can be obtained and the reaction is relatively homogeneous. Alternatively, it is possible to suspend the cellulose ether in an aprotic solvent or to use a solvent for the cellulose ether itself. Suitable aprotic solvents in which the alkyl(ene) succinic acid anhydride may be dissolved are esters, such as ethyl acetate or butyl acetate, ketones, such as acetone and methylethyl ketone, and hydrocarbons, such as toluene, xylene or $C_{5-10}$ aliphatic hydrocarbons. Solvents for the cellulose ether may be substituted amides, such as dimethyl acetamide.

The reaction temperature should be in the range of 40° to 150° C., preferably 60° to 110° C. The reaction time should be 0.5 to 12, preferably 1.45 to 6, most preferably 2 to 6 hours. The success of the reaction between the succinic acid anhydrides and the cellulose ethers may readily be analytically determined by treating the purified cellulose ether ester with alkali and determining the quantity of acid residues introduced through its consumption.

On completion of the reaction, particularly where the cellulose ether is reacted in a suspending agent, excess solvent is removed by filtration or centrifuging and the rest by heating, optionally in vacuo. Where the reaction is carried out in a solvent for the cellulose ether, the cellulose ether derivative may be precipitated with a miscible solvent which does not dissolve cellulose ether and the derivative isolated in the usual way. To prepare uniform pure products, any secondary products formed may even be removed by leaching with solvents, such as acetone or methylethyl ketone. In many cases, however, this purifying step is not necessary, because cellulose ether derivatives directly useable as such are generally obtained.

It is of course possible, if desired, subsequently to apply the known reaction of water-soluble cellulose ethers with glyoxal in order to convert the cellulose ether residues into products which dissolve without forming clumps.

The new cellulose ether derivatives obtainable in accordance with the invention show remarkably high viscosity in dilute aqueous solutions. In addition, these solutions in the immediate vicinity of the neutral pH point show a considerable change in viscosity in the event of minor changes in the pH value. The new cellulose ether derivatives are suitable as thickeners for aqueous surfactant solutions and dye dispersions and for hydraulically setting building materials. In addition, they may be used with advantage as protective colloids and emulsifiers in the suspension polymerization of water-insoluble monomers in aqueous phase.

EXAMPLE 1

In a 5-liter laboratory mixer, quantities of 300 g methylhydroxypropyl cellulose (particle size <0.2 mm) were sprayed at room temperature with solutions of (a) 15, (b) 30 and (c) 45 g dodecenyl succinic acid anhydride in (a) 50, (b) 100 and (c) 150 ml dried acetone. After thorough mixing for 15 minutes, the moist material was held for 3 hours at 100° C. in a drying cabinet. After cooling, the reaction product was washed three times with 300 ml acetone and then dried to constant weight at 100° C.

Analysis showed that (a) 1.0% by weight, (b) 3.6% by weight and (c) 6.0% by weight dodecenyl succinic acid residues had been introduced. 1% solutions of the acid pH reaction products in water were prepared and were adjusted to pH 7 with dilute sodium hydroxide. These solutions had respective viscosities of (a) 3000, (b) 7850 and (c) 6900 mPa.s, as measured with a Brookfield viscosimeter at 20 r.p.m./25° C.

The solution of a comparison sample of methylhydroxypropyl cellulose which was untreated had a viscosity of 2400 mPa.s under the same conditions.

A 10% by weight aqueous solution of a fatty alcohol ether sulfate ("Texapon" ASV, a trademark of Henkel KGaA, Germany) to which 1% by weight of the inventive product containing 3.6% by weight dodecenyl succinate had been added, had a viscosity at pH 6 of 7900 mPa.s. A comparison sample without the addition had a viscosity of only 1900 mPa.s.

EXAMPLE 2

Quantities of 20 g commercial methyl cellulose were dissolved with gentle heating in 1000 g dried dimethyl acetamide. Quantities of (a) 2 and (b) 3 g dodecenyl succinic acid anhydride were added to the solutions, the reaction mixtures heated under nitrogen to 90° C. and then stirred at that temperature for 2 hours. After cooling to room temperature, the cellulose derivatives were isolated by precipitation with an excess of acetone. Impurities were removed by washing three times with acetone, followed by drying at 50° C. in a vacuum drying cabinet to constant weight.

2.9% by weight dodecenyl succinic acid residues were introduced into (a) the first sample and 4.3% by weight into (b) the second sample. 1% by weight aqueous solutions showed Brookfield viscosities at 25° C. of (a) 62 and (b) 1000 mPa.s at pH 7. The value for a comparison sample treated in the same way without the inventive dodecenyl succinic acid anhydride was 48 mPa.s at a pH of 7.

When the pH value was adjusted to 6, a Brookfield viscosity of 1800 mPa.s was measured in (a) the first sample (1% aqueous solution, 25° C.) and one of 8500 mPa.s in (b) the second sample.

SAMPLE 3

20 g of a commercial methylhydroxypropyl cellulose were treated in the same way as in the preceding Example. In this case, quantities of (a) 1 g, (b) 2 g, (c) 3 g and (d) 4.6 g dodecenyl succinic acid anhydride were used. Reaction yielded products which contained (a) 2, (b) 3.85, (c) 4.32 and (d) 6.00% by weight, respectively, dodecenyl succinic acid groups and which had Brookfield viscosities (1% by weight solution, pH 7, 25° C.) of (a) 1500, (b) 26,000, (c) 44,000 and (d) 40,000 mPa.s, respectively.

A comparison sample of the starting methylhdyroxypropyl cellulose which had been subjected to the same treatment apart from the addition of dodecenyl succinic acid anhydride had a Brookfield viscosity of 1400 mPa.s at pH 7/25° C.

EXAMPLE 4

20 g of the same methylhydroxypropyl cellulose as in Example 3 was treated in the same way, except that a $C_{16-18}$ alkenyl succinic acid anhydride was used in a quantity of 1.2 g. 2.5% by weight of said alkenyl succinic acid moieties were introduced into the methylhydroxypropyl cellulose. The Brookfield viscosity of the product, as measured at 25° C., was 17,500 mPa.s at pH 7 and 21,000 mPa.s at pH 8. When the pH value was adjusted to 6, the viscosity of a 1% solution fell to 400 mPa.s at 25° C.

EXAMPLE 5

20 g of a commercial hydroxypropyl cellulose were treated as in Example 3 with 2 g dodecenyl succinic acid anhydride. 4.8% by weight dodecenyl succinic acid groups were thus introduced into the cellulose ether. A marked dependence on pH of the Brookfield viscosity at 25° C. of a 1% by weight aqueous solution of the esterified hydroxypropyl cellulose also was observed in this instance. A viscosity of 2000 mPa.s was measured at pH 8 while a value of 35,000 mPa.s was measured at pH 7/25° C.

A comparison sample which had been subjected to the same treatment apart from the addition of dodecenyl succinic acid anhydride had a Brookfield viscosity of only 620 mPa.s at pH 7/25° C.

EXAMPLE 6

100 g of a commercial methylhydroxypropyl cellulose were suspended in 500 g dry toluene and a solution of 15 g dodecenyl succinic acid anhydride in 20 ml toluene added to the resulting suspension. The reaction mixture was stirred for 3 hours at 90° C. and filtered after cooling. The modified cellulose ether was purified by repeated washing with excess acetone. The modified cellulose ether thus purified was then dried to constant weight at 90° C. in a laboratory drying cabinet and ground to a particle size of 0.2 mm in a laboratory mill. Analysis showed that 3.5% by weight of dodecenyl succinic acid residues had been introduced into the cellulose ether.

A viscosity of 4600 mPa.s was measured on a 1% aqueous solution (Brookfield viscosimeter 20 r.p.m.; 25° C.; pH 7).

By contrast, a comparison sample which had been treated in the same way apart from the addition of dodecenyl succinic acid anhydride had a viscosity of 1150 mPa.s (1% by weight solution, 25° C.).

Because of the interesting significant viscosity variability with pH, the inventive compounds can also be used in many other ways; for example as an indicator of pH change in a circulating fluid to which it has been added (by monitoring the pH by simple mechanical measurement of viscosity); to the extent the compounds are acceptable as food additives, as a viscosity increaser for a pre-prepared food or for a food to be mixed in the home, and whose viscosity increases/decreases with pH change caused by adding other ingredients. Similarly, in industrial use, the viscosity of an in-place fluid can be increased or decreased as desired, by adjusting the pH. This invention, therefore, also encompasses a means for changing the viscosity of a fluid, by incorporating effective amounts of the inventive compounds and of a pH adjusting compound.

We claim:

1. A method for synthesizing water-soluble derivatives of cellulose ethers comprising reacting
   (A) 100 parts by weight of at least one water-soluble cellulose ether selected from the group comprising methylcellulose, methoxycellulose, hydroxyethylcellulose, hydroxypropylcellulose and methylhydroxypropylcellulose, with
   (B) 3 to 30 parts by weight of at least one C8–18 alkyl or alkenyl succinic anhydride, under conditions in which the reaction is:
   (1) essentially free of water;
   (2) acid or neutral;
   (3) at a temperature of 40° to 150° C.; and
   (4) for a period of 0.5 to 12 hours,
wherein a high viscosity derivative is produced by reaction of about 1–8% by weight (based on the weight of the cellulose ether) of at least one succinic acid anhydride.

2. The method of claim 1 wherein said reaction is continued until about 3 to 6% by weight of said anhydride has reacted with said ether.

3. The method of claim 1 wherein said reaction temperature is in the range of about 40° to 150° C. and said reaction is conducted for about 0.5 to 12 hours.

4. The method of claim 1 wherein said reaction temperature is in the range of about 60° to 110° C. and said reaction is conducted for about 2 to 6 hours.

5. The method of claim 1 wherein said acid anhydride is present in about 5 to 25 parts by weight.

6. The method of claim 1 wherein at least one water-free organic solvent is present as a reaction medium.

7. The method of claim 1 wherein said reaction temperature is about 40° to 150° C. and said reaction is conducted for about 0.5 to 12 hours.

8. The method of claim 1 wherein said reaction temperature is about 60° to 110° C., said reaction is conducted for about 2 to 6 hours, said acid anhydride is present in about 5 to 25 parts by weight, and at least one water-free organic solvent is present as a reaction medium.

9. The method of claim 1 wherein said ether is methylcellulose and/or methylhydroxypropyl cellulose, and said acid anhydride is dodecenyl succinic acid anhydride and/or a $C_{16-18}$ alkenyl succinic acid anhydride.

10. The method of claim 8 wherein said ether is methylcellulose and/or methylhydroxypropyl cellulose, and said acid anhydride is dodecenyl succinic acid anhydride and/or a $C_{16-18}$ alkenyl succinic acid anhydride.

11. An acid substituted ether produced by the method of claim 1.

12. An acid substituted ether produced by the method of claim 1.

13. An acid substituted ether produced by the method of claim 2.

14. An acid substituted ether produced by the method of claim 7.

15. An acid substituted ether produced by the method of claim 8.

16. An acid substituted ether produced by the method of claim 9.

17. An acid substituted ether produced by the method of claim 10.

* * * * *